(12) United States Patent
Herrero-Verón

(10) Patent No.: US 8,139,530 B2
(45) Date of Patent: Mar. 20, 2012

(54) MOBILITY MANAGEMENT (MM) AND SESSION MANAGEMENT (SM) FOR SAE/LTE

(75) Inventor: Christian Herrero-Verón, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 868 days.

(21) Appl. No.: 12/042,564

(22) Filed: Mar. 5, 2008

(65) Prior Publication Data
US 2008/0233947 A1 Sep. 25, 2008

Related U.S. Application Data

(60) Provisional application No. 60/896,345, filed on Mar. 22, 2007.

(51) Int. Cl.
*G06F 17/00* (2006.01)
(52) U.S. Cl. ........ 370/329; 370/346; 455/422; 455/442; 455/436; 455/432
(58) Field of Classification Search .................... 370/329
See application file for complete search history.

(56) References Cited

U.S. PATENT DOCUMENTS

| | | | |
|---|---|---|---|
| 2005/0254469 A1* | 11/2005 | Verma et al. | 370/338 |
| 2007/0019643 A1 | 1/2007 | Shaheen | |
| 2007/0021120 A1 | 1/2007 | Flore et al. | |
| 2007/0213060 A1* | 9/2007 | Shaheen | 455/436 |
| 2008/0096563 A1* | 4/2008 | Fischer et al. | 455/436 |
| 2008/0184032 A1* | 7/2008 | Li et al. | 713/171 |

FOREIGN PATENT DOCUMENTS

WO  WO 2006/114628 A  11/2006

OTHER PUBLICATIONS

"3GPP TR 23.882 v 1.9.0 (Mar. 2007) $3^{rd}$ Generation Partnership Project; Technical Specification Group Services and System Aspects; 3GPP System Architecture Evolution: Report on technical options and conclusions (Release 7)"3RD Generation Partnership Project (3GPP); Technical Report (TR), XX, XX, vol. 23.882, No. V1.9.0, Mar. 1, 2007, XP002451761.

* cited by examiner

*Primary Examiner* — Jeffrey Pwu
*Assistant Examiner* — Sulaiman Nooristany
(74) *Attorney, Agent, or Firm* — Roger S. Burleigh

(57) ABSTRACT

A system and method for using Mobility Management (MM) and Session Management (SM) procedures in an SAE/LTE system. The present invention modifies several MM and SM procedures that have been defined for other 3GPP access systems (such as GERAN, UTRAN) so that they meet the requirements of LTE/SAE. While the present invention re-uses some existing procedures, it further defines new protocols for MM and SM procedures when accessing 3GPP systems by Evolved UTRAN (EUTRAN). With respect to the new protocols, the encoding rules are re-used from the existing MM and SM procedures and a very similar general message format is created. With respect to the signaling messages, the present invention re-uses the existing information element definitions for each parameter included in a message.

6 Claims, 5 Drawing Sheets

MOBILITY MANAGEMENT (MM) AND SESSION MANAGEMENT (SM) FOR SAE/LTE

CROSS-REFERENCE TO RELATED APPLICATION

This application claims the benefit of U.S. Provisional Application No. 60/896,345, filed Mar. 22, 2007, the disclosure of which is incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

As used herein, the following acronyms shall have the following meanings:
3GPP Third Generation Partnership Project
AS Access Stratum
CC Call Control
CM Connection Management
CN Core Network
CS Circuit Switched
eNB e-Node B
EPC Evolved Packet Core
EUTRAN Evolved UTRAN
FDD Frequency Division Duplex
GERAN GSM Edge Radio Access Network
GMM GPRS Mobility Management
GPRS General Packet Radio System
GSM Global System for Mobile Communications
IP Internet Protocol
LLC Logical Link Control
LTE Long Term Evolution
MAC Medium Access Control
MM Mobility Management
MME Mobility Management Entity
MS Mobile Station
MSC Mobile Switching Center
NAS Non-Access Stratum
PDU Packet Data Unit
PS Packet Switched
P-TMSI Packet Temporary Mobile Subscriber Identity
RANAP Radio Access Network Application Part
RLC Radio Link Control
SAE System Architecture Evolution
SA WG System Architecture Work Groups
SGSN Serving GPRS Support Node
SM Session Management
SMS Short Messaging Service
SS Supplementary Services
TDD Time Division Duplex
UE User Equipment
UTRA Universal Terrestrial Radio Access
UTRAN UMTS Terrestrial Radio Access Networks The Third Generation Partnership Project (3GPP) is a collaboration that was established in December 1998 by the signing of the 3rd Generation Partnership Project Agreement. Third generation systems based on 3GPP specifications rely on the evolution of the so called 2.5 generation Global System for Mobile Communications (GSM) network standards. 3GPP is charged with preparing, approving and maintaining the necessary set of Technical Specifications and Technical Reports for: UMTS Terrestrial Radio Access Networks (UTRAN), including Universal Terrestrial Radio Access (UTRA) (in Frequency Division Duplex (FDD) and in Time Division Duplex (TDD) modes); 3GPP Core Network (capabilities evolved from GSM: include Mobility Management (MM), global roaming, and utilization of relevant Internet Protocols); User Equipment (UE) and terminals for access to the above, and system and service aspects.

The Long Term Evolution (LTE) of the 3G mobile system started in 2004. The initial focus was on the evolution of the UTRA. A set of high level requirements was identified, including reducing the cost per bit, increasing service provisioning, using existing and new frequency bands flexibly, simplifying architecture, using open interfaces and facilitating reasonable terminal power consumption. On certain aspects, the collaboration with 3GPP System Architecture Work Groups (SA WGs) was found to be essential. The split between the Access Network and the Core Network, and the characteristics of the throughput that new services would require demanded close architectural coordination.

A feasibility study on the UTRA and UTRAN LTE was started in December 2004. The objective was to develop a framework for the evolution of the 3GPP radio-access technology leading to a high-data-rate, low-latency and packet-optimized radio-access technology. The study focused on supporting services provided from the Packet Switched (PS) domain, involving, related to the radio-interface physical layer (downlink and uplink), means to support flexible transmission bandwidth up to 20 MHz, introduction of new transmission schemes and advanced multi-antenna technologies and, related to the radio interface layer 2 and 3, signalling optimization. Related to the UTRAN architecture, an objective was to identify the optimum UTRAN network architecture and functional split between RAN nodes.

All RAN WGs participated in the study, with collaboration from SA WG2 in the area of the network architecture. RAN WG3 worked closely with SA WG2 in the definition of the new architecture. The Evolved UTRAN (EUTRAN) consists of e-Node Bs (eNBs), providing the Evolved UTRA user plane and control plane protocol terminations towards the UE. With respect to System Architecture Evolution (SAE), SA WG2 commenced a study for the SAE whose objective was to develop a framework for an evolution or migration of the 3GPP system to a higher-data-rate, lower-latency, packet-optimized system that supports, multiple radio access technologies.

Mobility Management (MM) and Session Management (SM) procedures are conventionally defined for other 3GPP access systems (GSM Edge Radio Access Network/Universal Terrestrial Radio Access Network (GERAN/UTRAN)). However, such procedures have not been defined for LTE/SAE.

Different types of data are passed through an LTE/SAE system. The term signaling is often used to define the type of data that is used to send special control messages that are used to control the system in some manner. The other type of information, the user data, refers to the actual user information that is sent from some source user to a destination user or destination application. In general, the signaling data passes through the control plane. The user data passes through the user plane.

For existing 3GPP systems, the Access Stratum (AS) carries all of the signaling and user data messages that relate to the access technology used across a specific interface in that part of the system. Across the radio interface, the AS protocols are the lower level protocols between the UE and the radio access network, e.g., UTRAN, and between the radio access network. e.g., UTRAN, and the Core Network (CN).

Additionally, at present, the Non-Access Stratum (NAS) carries the signaling messages and user data messages that are independent of the underlying access mechanism. These signaling and user data are passed between the UE and the CN and, conceptually, pass transparently through the radio access network, e.g., UTRAN.

For existing 3GPP systems, the NAS contains procedures for MM for a CS and PS (e.g., General Packet Radio System (GPRS)) as well as CC, SM for GPRS, SMS and SS.

In order to determine the location of the MM and SM procedures in the protocol stack architecture for LTE/SAE, the protocol architecture as defined by SA WG2 must be taken into account. The SAE architecture provides support for packet-switched domain services only. Within the SAE architecture the MME is responsible for the distribution and reception of messages from/to the UE through the eNBs; e.g., paging messages.

It should be noted that UE or terminals which handle communication towards an LTE access system (EUTRAN) and/or existing GERAN, UTRAN would be required, that is 3GPP accesses. As a result, interoperability and mobility between different access networks is a requirement for these UEs and terminals. Further, extensive updates in the UEs or terminals should be avoided since this will, most likely, delay the implementation of SAE. For existing 3GPP systems (such as GERAN, UTRAN), the UE and the core-network, being the Serving GPRS Support Node (SGSN) and Mobile Switching Center (MSC), provide procedures for MM as well as for CC, SM for GPRS (PS domain only), SMS and SS. These procedures are part of the NAS.

There are two different sets of MM procedures specified for CS domain and for PS domain. These two sets of procedures are grouped into two different protocols and handled or managed by different entities.

At present, the MM layer provides support for mobility of UEs, such as informing the network of its present location and providing user identity confidentiality. There are two different entities in the MM layer; the MM entity which handles the protocol (and procedures) for non-GPRS services (CS domain) and the GPRS MM (GMM) entity which handles the protocol (procedures) for GPRS services (PS domain). See 3GPP TS 23.060, 24.007, 24.008.

Examples of the types of signaling messages that are carried via the AS are messages that control the power control loops in the system and handover procedures and that allocate channels to a user for use, for instance in a speech call. An example of an NAS signaling message would be one associated with a call setup request, where the call setup messages are independent of the underlying access mechanism. In this example, the call setup message would come from the CN, and be routed transparently through the AS.

As seen in FIG. 1, the present version of the 3GPP TS 23.401 [2] discloses a UE 101 connected via the LTE-Uu interface 102 to the network (EPC) by two reference points. These are the S1-MME 103, for the control plane, and the S1-U 104 for the user plane. As seen therein, the MME communicates with the existing Serving GPRS Support Node (SGSN) 105. The LTE/SAE architecture provides support only for PS domain services. Hence, to use existing GMM and SM procedures for LTE access systems (such as EUTRAN), requires certain modifications or new procedures. GMM provides three different types of procedures and is located in the network (SGSN) and the UE. These are GMM common procedures, GMM specific procedures and GMM connection management procedures. GMM common procedures are initiated by the network when the UE is registered to the network. These procedures include Packet Temporary Mobile Subscriber Identity (P-TMSI) re-allocation, GPRS authentication and ciphering, GPRS identification and GPRS information. GMM specific procedures are either initiated by the network or the UE. Procedures initiated by the network include: detach the UE for GPRS services and/or non-GPRS services and GPRS detach. Procedures initiated by the UE include GPRS attach, detach, and routing area updating. The GMM connection management procedure is used only when the UE obtains access through a UTRAN. These procedures are initiated by the UE and used to establish a secure connection to the network and/or to request the resource reservation for sending data; service request.

FIG. 2 illustrates the protocol architecture 200 used by between a UE that is capable of communicating over both a CS network and PS network. FIG. 3 illustrates the control plane protocol stack 300 for a mobile station (MS) in communication with a SGSN. FIG. 4 illustrates the conventional control plane protocol stack 400 for a UE in communication with a SGSN.

SUMMARY

The present invention is directed to a system and method for using Mobility Management (MM) and Session Management (SM) procedures in an SAE/LTE system. The present invention modifies some MM and SM procedures that have been defined for other 3GPP access systems (such as GERAN, UTRAN) so that they meet the requirements of LTE/SAE. While the present invention re-uses some existing procedures, it further defines new protocols for MM and SM procedures when accessing 3GPP systems by EUTRAN. With respect to the new protocols, the encoding rules are re-used from the existing MM and SM procedures and a very similar general message format is created. With respect to the signaling messages, the present invention re-uses some of the existing information element definitions for each parameter included in a message.

DESCRIPTION OF THE SEVERAL VIEWS OF THE DRAWING

In the following section, the invention will be described with reference to exemplary embodiments illustrated in the figures, in which.

DETAILED DESCRIPTION

Procedures are sequences of statements that perform an action, a set of input parameters to modify those actions, and possibly an output value of some kind. Whereas a protocol specifies one or more of the following properties: detection of the underlying physical connection (wired or wireless), or the existence of the other endpoint or node; handshaking; negotiation of various connection characteristics; how to start and end a message; how to format a message; what to do with corrupted or improperly formatted messages (error correction); how to detect unexpected loss of the connection, and what to do next; and termination of the session or connection. In other words, a protocol contains one or more procedures. Protocol can be seen as the language (e.g., set of rules, format) used between two entities and procedures are operations used in order to exchange information. From a 3GPP point of view, a signaling protocol is the set of rules in order to communicate two entities; including a number of protocol elements such as protocol terminating points, general format structure, encoding rules, protocol identities, procedures or operations, messages or Packet Data Units (PDU), Information Elements (IE), state machines (when necessary) in the sending and receiving entities. A procedure is one of the protocol elements, and contains a number of messages or PDUs) IEs exchanged, and may result in changes in the state machines of both the sending and receiving entities.

The present invention modifies some MM and SM procedures that have been defined for other 3GPP access systems (such as GERAN, UTRAN) so that they meet the requirements of LTE/SAE. While the present invention re-uses some existing procedures, it further defines new protocols for MM and SM procedures when accessing 3GPP systems by EUTRAN. With respect to the new protocols, the encoding rules are re-used from the existing MM and SM procedures and a very similar general message format is created. With respect to the signaling messages, the present invention re-uses the existing information element definitions for each parameter included in a message. Specifically, the present invention uses GPRS MM (GMM) and SM procedures for non-access stratum (NAS) signaling between the UE and the MME for LTE access (using EUTRAN).

Figure 5:
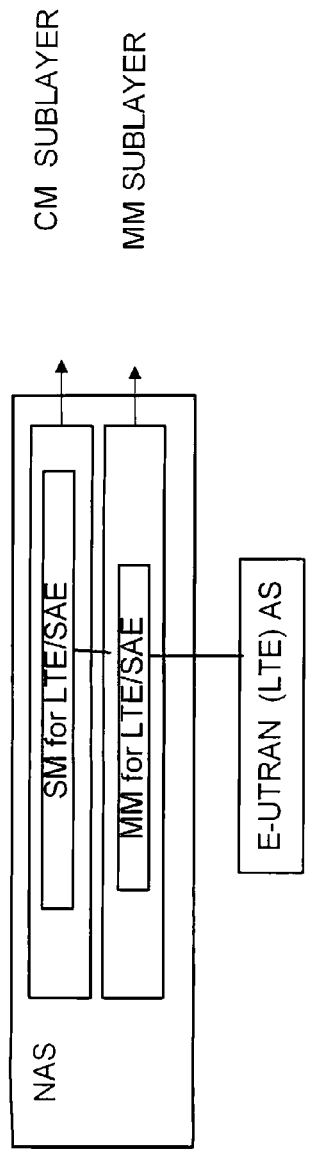
FIG. 5 illustrates the protocol architecture of the present invention in an LTE/SAE only UE.
Figure 6:
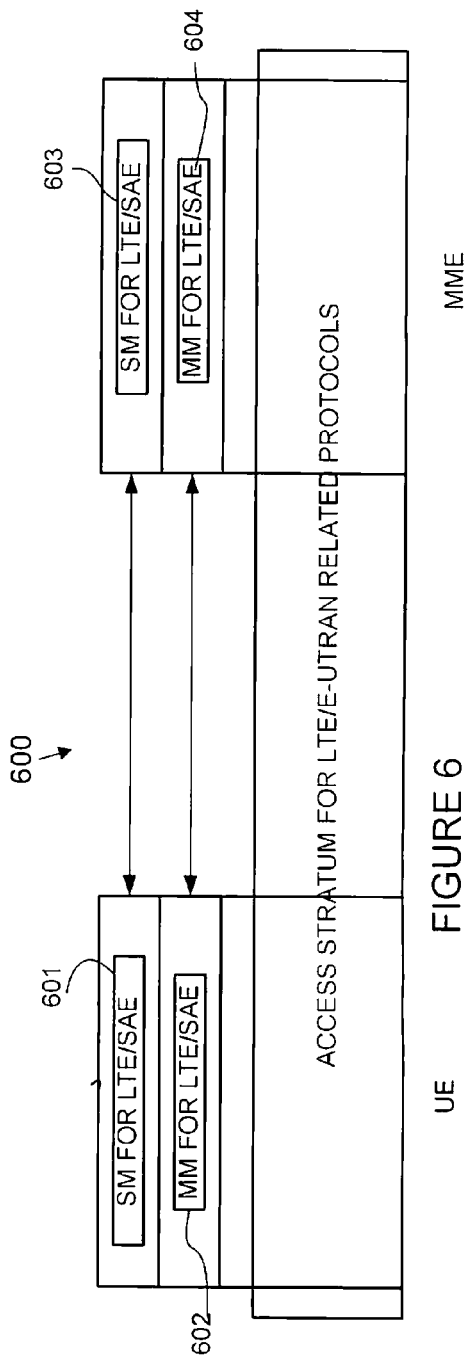
FIG. 6 illustrates the control plane protocol stack of the present invention in an LTE/SAE only UE.

FIGS. 5 and 6 illustrate the protocol architecture in the UE according to the present invention. More particularly, FIG. 5 illustrates the protocol architecture 500 for a UE that supports LTE/SAE only, and FIG. 6 illustrates the protocol architecture 600 for a UE that supports GERAN/UTRAN and LTE/SAE. As seen in FIG. 6, the SM and MM protocols 601/602 for GERAN/UTRAN must communicate with the SM and MM for LTE/SAE 603/604. This communication coordinates protocols and state machines to support inter-system change to/from LTE/SAE and other 3GPP access systems.

Figure 7:
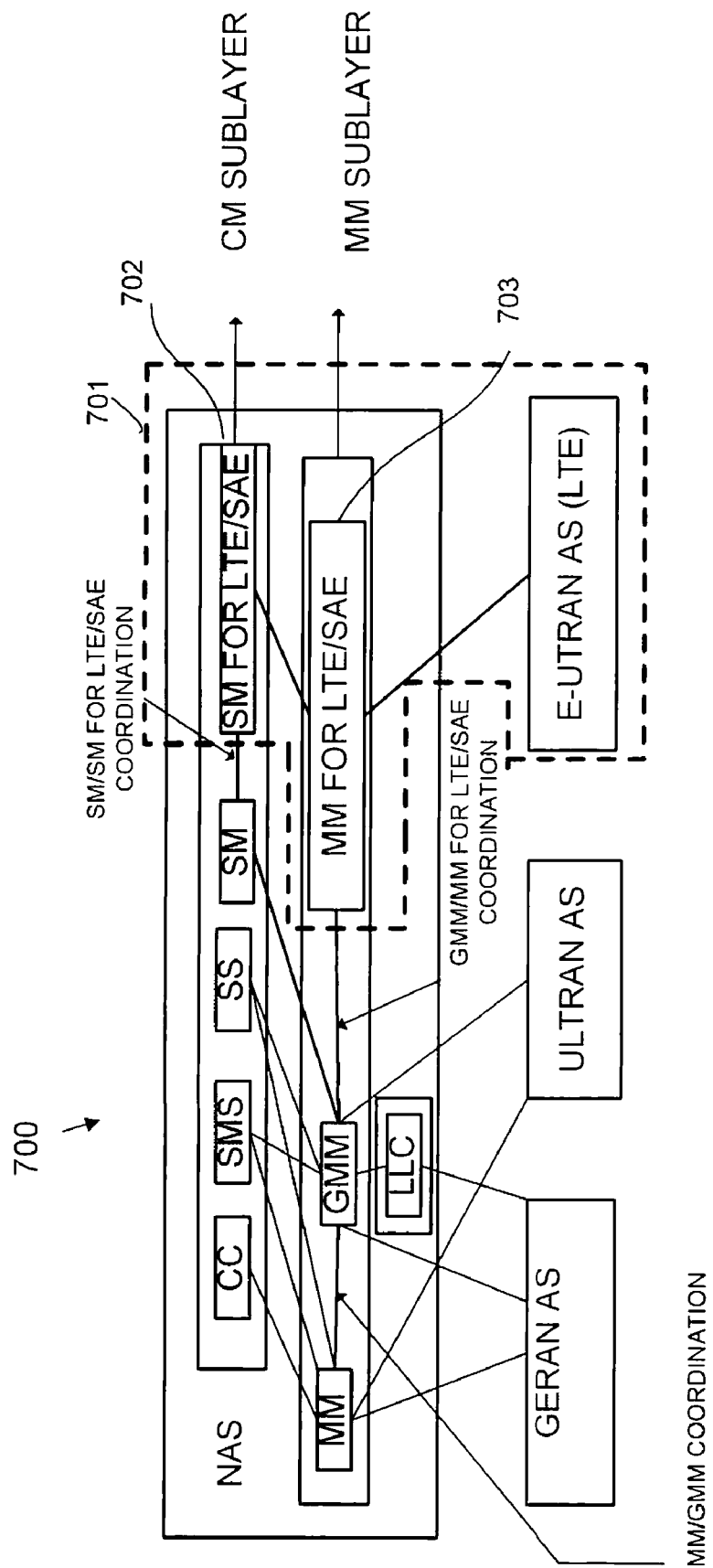
FIG. 7 illustrates a protocol architecture of the present invention in a GERAN/UTRAN and LTE/SAE UE.

The present invention, in one aspect, can be seen as being within the dotted section 701 of the protocol architecture 700 of FIG. 7. As see in FIG. 7, MM for LTE/SAE 702 and SM for LTE/SAE 703 are new entities, and therefore new protocols. For inter-system change to/from other 3GPP access systems coordination between GMM and SM and SM and MM for LTE/SAE is necessary, as seen in FIG. 7. This includes, but is not limited to, mapping of identities and contexts between GMM and MM for LTE/SAE and between MM and MM for LTE/SAE.

Figure 1:
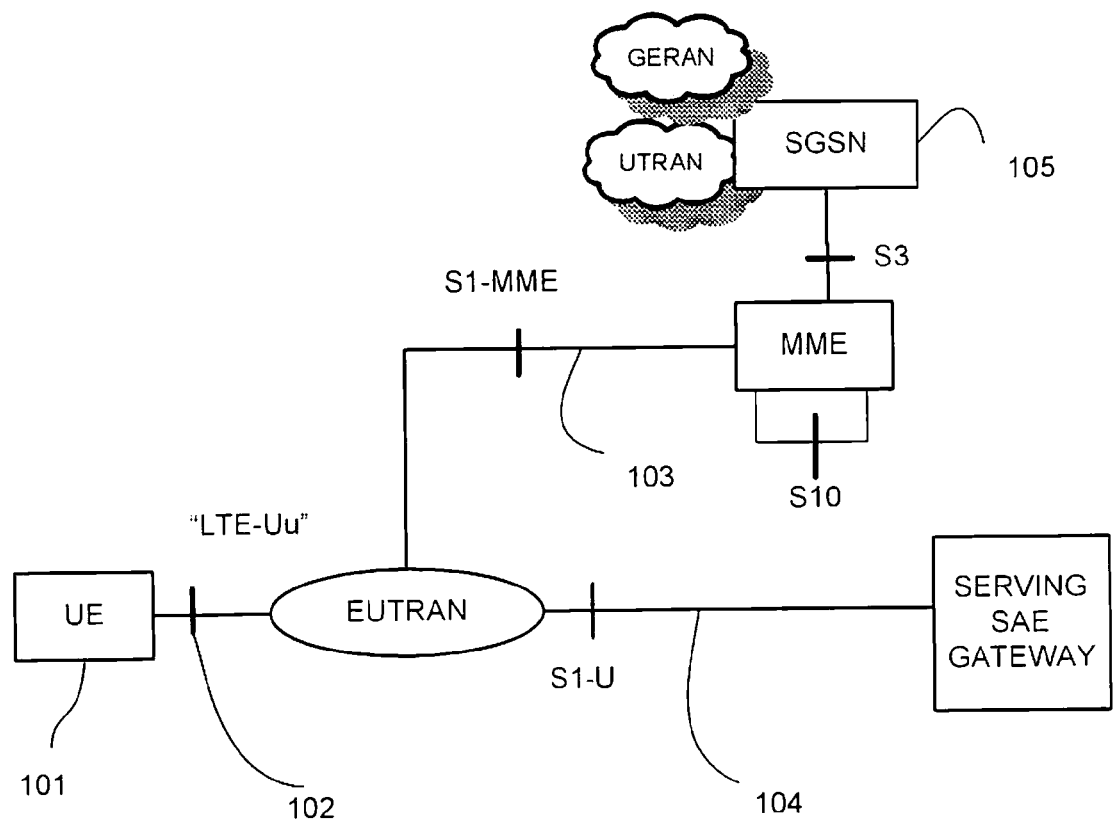
FIG. 1 is a partial system block diagram disclosing a UE connected via the LTE-Uu interface to the network (EPC) by two reference points: the S1-MME, for the control plane, and the S1-U for the user plane.
Figure 2:
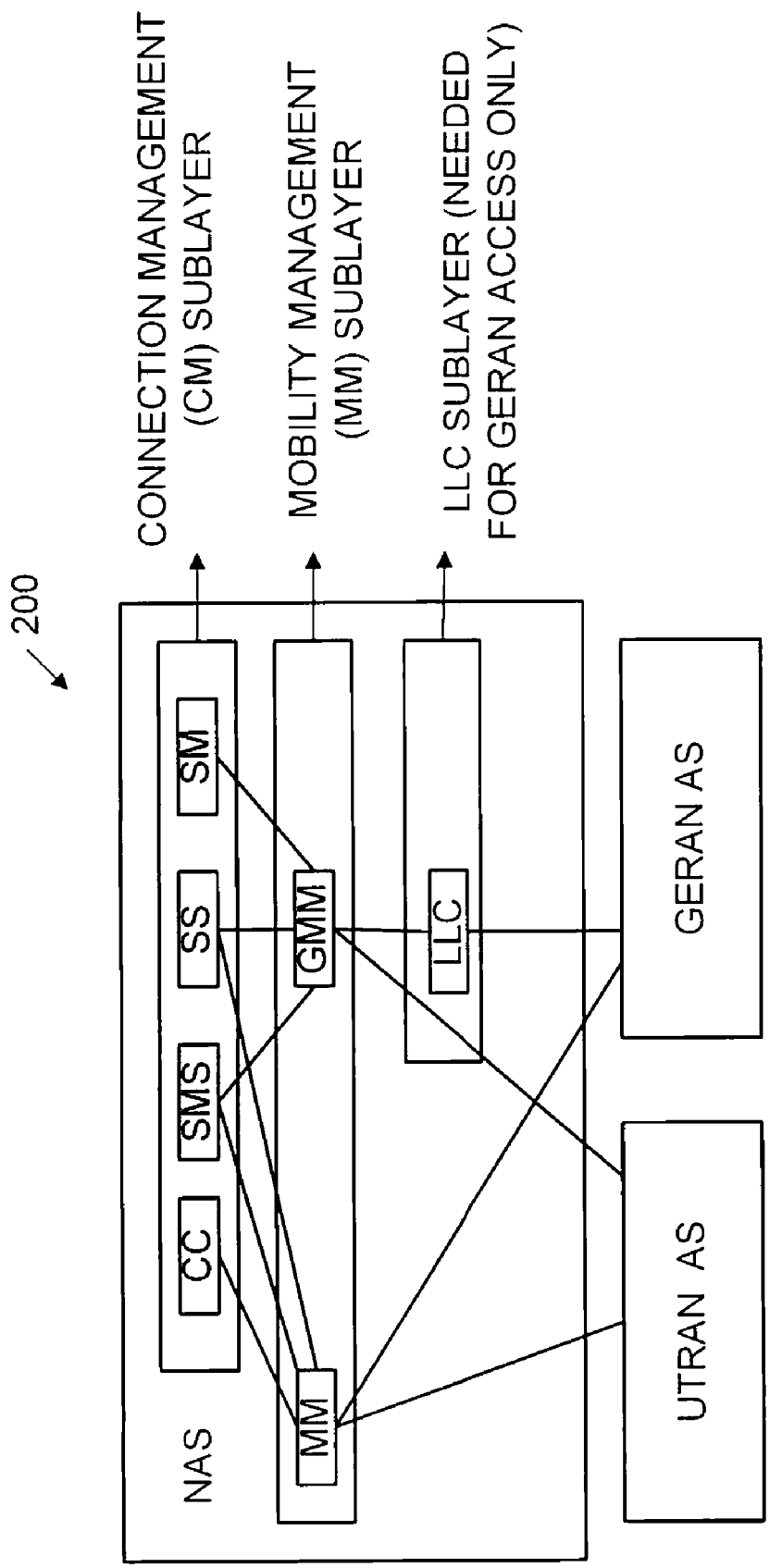
FIG. 2 illustrates the protocol architecture used by between a UE that is capable of communicating over both a circuit switched (CS) network and packet switched (PS) network.
Figure 3:
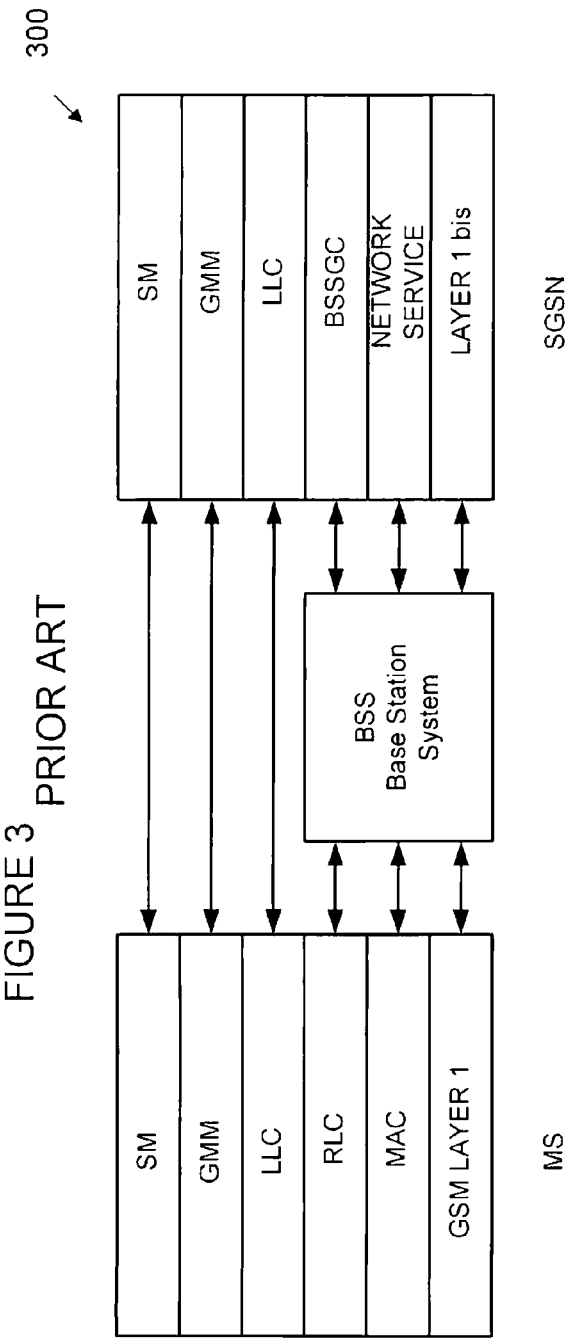
FIG. 3 illustrates the control plane protocol stack for a mobile station (MS) in communication with a SGSN.
Figure 4:
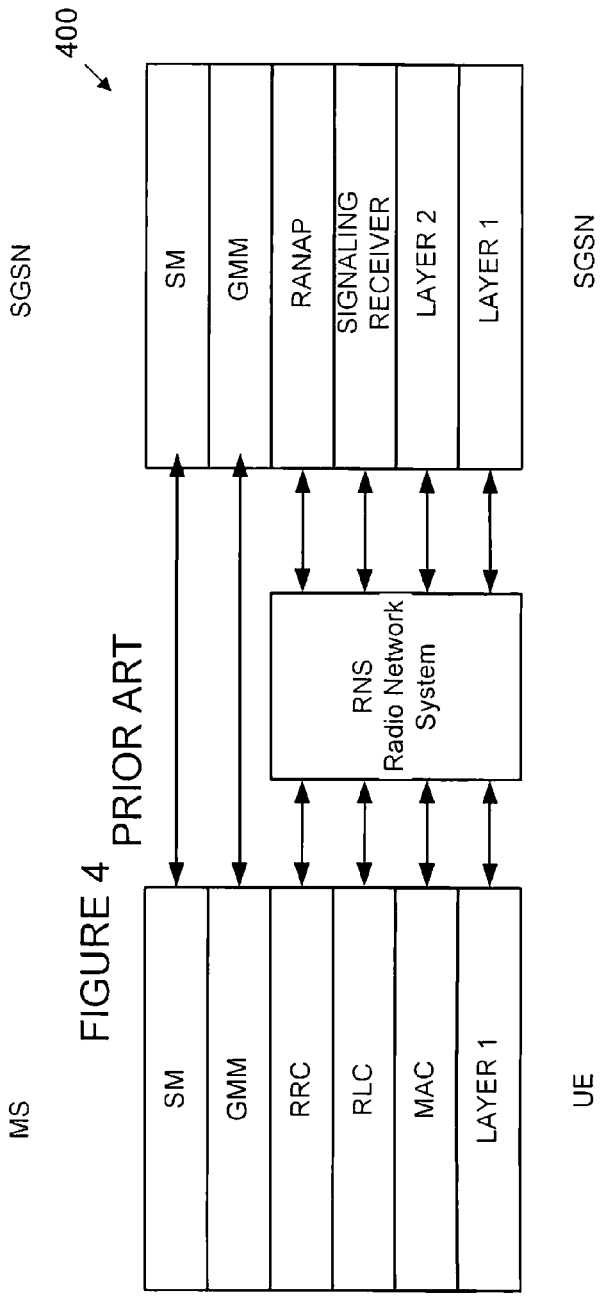
FIG. 4 illustrates the control plane protocol stack for a UE in communication with a SGSN.

Referring back to FIGS. 1 and 2, the MME used in LTE/SAE can be similar to that used in a conventional SGSN as the UE exists in both existing 3GPP systems and LTE/SAE. Therefore, in principle, all MM procedures conventionally used by the SGSN can be used in LTE/SAE, including the service request procedure. The messages involved in these procedures as well as the parameters and information element definitions can also be used for LTE/SAE. However, the present invention modifies the existing procedures in some cases to adapt them to the requirements of LTE/SAE, as more fully described herein.

The P-TMSI re-allocation procedure for existing 3GPP systems (3GPP TS 24.008) provides identity confidentiality. This protects a user from being identified and located by an intruder by re-allocating a new P-TMSI to the UE. For LTE/SAE the same identity name and identity format definition can be re-used or a new identity can be created with a different name. Therefore, the present invention includes a procedure for re-allocation of P-TMSI using a different name and format. The procedure includes a re-allocation command message from the MME to the UE with a new temporary identity to be used and a reallocation command message from the UE to the MME acknowledging the new temporary identity.

The GPRS authentication and ciphering for existing 3GPP systems performs authentication and key agreement between the network and the UE and further may cause the GERAN to start or stop ciphering (encryption) of the information transmitted. The present invention includes an authentication and ciphering procedure between the UE and MME for LTE/SAE whereby authentication and key agreement can take place. Ciphering and integrity protection of the MM and SM information for LTE/SAE is provided by the conventional procedure or by a new specific security mode command for MM for LTE/SAE in a manner similar to a conventional security mode command in UTRAN used by lower layers. In any case, the present invention includes an authentication request, and authentication response (in case of success), an authentication reject (in case of failure), a security mode command request, security mode command complete (in case of success) and a security mode command reject (in case of failure).

The GPRS identification procedure is used to request the UE to provide specific identification parameters such as the International Mobile Subscriber Identity (IMSI) and the International Mobile Equipment Identity (IMEI). This identification procedure is similar in the present invention. For LTE/SAE, an identity request message is sent from the MME to the UE and an identity response message is sent from the UE to the MME. The information to be requested and provided can be as in the GPRS identification procedure or modified in the event new identities as created for LTE/SAE.

The GMM information procedure carries information to the UE, such as network name and time. This procedure can also be used for LTE/SAE though it would likely be referred to as the LTE information procedure or, for example, Evolved-MM (EMM) information procedure. Also, the information provided to the UE can be the same as that provided in the GMM information procedure or different. The LTE/SAE information procedure will include an information request message MME to the UE and an information response from the UE to the MME.

The present invention further includes an attach procedure operable to attach a UE for packet services in LTE/SAE. Because LTE/SAE is a packet based system, an attach procedure to attach to non-packet services is not required. The LTE/SAE attach procedure would include an attach request message from the UE to the MME, an attach accept, if successful, from the MME, attach reject, if failure, from the MME and an attach complete from the UE when a new temporary identity is allocated to the UE by means of the attach procedure. Further, the LTE/SAE attach procedure is used not only to attach to packet services in LTE/SAE but also to establish a radio bearer in order to transmit and receive packet data services, thus enabling always-on IP connectivity to the UE. Although the LTE/SAE attach message names could be re-used from conventional 3GPP attach procedure, in the present invention the content of the messages would be different, as certain GSM related parameters, such as to attach to non-packet services, sent by the UE are not needed in LTE/SAE.

In the present invention, the identities that are exchanged in LTE/SAE are the same as in the GSM system. As in the GSM attach procedure, in the present invention the MME allocates a new temporary identity each time an attach procedure is performed. Further, an identity of the last area where the UE was registered and roaming could be sent. Discontinuous Reception (DRX) mode parameters are also indicated by the UE during the attach request, as well as the type of attach, for example, normal, or re-attach. In LTE/SAE, an area can be indicated similar to the routing area identity in GSM. However, in the present invention, new parameters are used to allow the establishment of a radio bearer during the attach procedure. This parameters are similar to an exchange during a UE initiated Packet Data Protocol (PDP) context activation. These include a request from the UE in the attach request message of receiving either an Internet Protocol version 4 (IPv4) or IP version 6 (IPv6) address or both IPv4 and IPv6 addresses. The IP address or addresses allocated are indicated by the MME in the attach accept message. The UE is also adapted to indicate an Access Protocol Name (APN) to select a specific network from which to connect.

The present invention further includes a detach procedure to detach a UE for packet services in LTE/SAE. A detach request may be sent by either the UE or the MME and a detach accept may be sent by both in order to indicate successful detach.

The present invention includes a procedure for performing location update of the UE in order to update the registration in the MME of the area or location where the UE is roaming. Note that the procedure is not limited to a GERAN/UTRAN routing area update. The present invention is also adapted to perform updates to notify the system of an inter-system change to other access technologies, e.g., GERAN, UTRAN. The location update request message is sent by the UE to the MME indicating the type of update. A location update accept message or reject message is sent from the MME and a location update complete message is sent from the UE when a new temporary identity is allocated by the MME.

The present invention further includes a service request procedure to establish a secure (logical) connection from the UE to the MME. In the present invention, the service request message is from the UE and a service accept or reject message is sent from the MME to the UE.

The purpose of the SM protocol in GPRS is to support packet data protocol (PDP) context handling of the UE. Furthermore, SM supports the multimedia broadcast multimedia service (MBMS) context handling within the UE and the network, which allows the UE to receive data from a specific MBMS source. The SM protocol hence envisions procedures for PDP context activation, deactivation and modification as well as MBMS context activation and deactivation. The content and name of a PDP context for LTE/SAE may be different than that for other 3GPP access systems, as the radio access part for LTE/SAE differs from GERAN/UTRAN, that is, the establishment of radio bearers might be different. However, because of the need of simple inter-system change with other 3GPP access systems, the present invention encompasses the same structure and value range of the current Network Service Access Point Identifier, as described in 3GPP TS 24.008 (NSAPI) used for identifying a PDP context for LTE/SAE, though the name used may be different.

GMM is a GPRS signaling protocol that handles mobility issues such as roaming, authentication and selection of encryption algorithms. The GMM with SM (GMM/SM) protocol supports the mobility of a UE so that the SGSN can know the location of a mobile station (MS) at any time and to activate, modify and deactivate the PDP sessions required by the MS for the user data transfer.

In the present invention, the SM for LTE/SAE includes a packet data protocol context in order to establish, modify or tear down PDP sessions. These procedures, such as request for activation of a particular PDP session, modify or tear down, the same as those in GMM/SM, as performed from the MME or the UE.

The present invention re-uses some procedures from other 3GPP access systems, with enhancements are required by LTE/SAE, such enhancements being made to messages and parameters or by adding new procedures to be used for LTE/SAE. In some circumstances, the present invention includes separate protocols for LTE/SAE. In such circumstances, a new Protocol Discriminator (PD) for each of MM and SM for LTE/SAE is required.

In certain circumstances, it is preferable for the present invention to use new protocols, as the MM and SM procedures for LTE/SAE are terminated in a different network entity than that in other 3GPP access systems. In other 3GPP access systems, the GMM and the SM terminates in the SGSN while for LTE/SAE terminates in the MME. This would be similar to the case of MM, which is a separate protocol from GMM, as MM communicates to the MSC and GMM to the SGSN Additionally, the messages for MM and SM for LTE/SAE are different than those required by a conventional 3GPP access system. Also, it is unnecessary to reuse certain GMM protocol procedures, such as those that attach both GPRS and non-GPRS services. The identities used in LTE/SAE does not need to be identical to those used in existing 3GPP access systems. Identities are mandatory parts of messages and contexts stored in both network and terminal. If the same protocols used in other 3GPP access systems are reused, then mandatory information elements in each message of the protocol become immediately mandatory for LTE/SAE, although, in some cases, these would not be used. These information elements must always be encoded, e.g., with dummy values, but using bandwidth and processing time, set and received by the UE and the MME. When using new protocols for MM and SM for LTE/SAE there is a need to define a general message format for MM and SM messages. This can be thought of as a reuse the general message format for GMM as described in 3GPP TS 24.008. In this way, just a protocol discriminator, skip indicator or transaction identifier (depending of the message) and a message type are needed. For the case of SM for LTE/SAE, the same conclusion may be drawn by looking to the SM for other 3GPP access system messages, and therefore a transaction identifier in place of the skip indicator would be always needed.

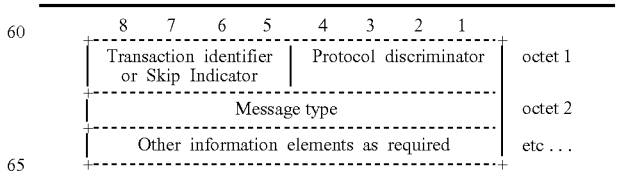

3GPP TS 24.008 General Message Organization Example

However, SM for other 3GPP access systems makes use of the Transaction Identifier (TI) and the NSAPI for the session management procedures. In principle, the TI is used for addressing messages and the NSAPI is used for identification on the user-plane, but both identifiers are allocated for the life of a particular PDP context and is contained in almost all SM messages. Then, the use of TI and NSAPI seems redundant in most cases.

For the SM messages for LTE/SAE, a conventional or new PDP context identity (NSAPI) for LTE/SAE may suffice, rather than the use of the TI in the messages. In any event, the PDP context identify for LTE/SAE should be included in all necessary messages. Hence, the present invention includes the following general message format:

| 8 | 7 | 6 | 5 | 4 | 3 | 2 | 1 | |
|---|---|---|---|---|---|---|---|---|
| Skip indicator | | | | Protocol discriminator | | | | octet 1 |
| Message type | | | | | | | | octet 2 |
| Other information elements as required | | | | | | | | octet 3 |
| | | | | | | | | octet n |

General Message Organization Example for MM for LTE/SAE

| 8 | 7 | 6 | 5 | 4 | 3 | 2 | 1 | |
|---|---|---|---|---|---|---|---|---|
| PDP context identity for LTE/SAE | | | | Protocol discriminator | | | | octet 1 |
| Message type | | | | | | | | octet 2 |
| Other information elements as required | | | | | | | | octet 3 |
| | | | | | | | | octet n |

General Message Organization Example for SM for LTE/SAE

The general message format for SM for LTE/SAE assumes that the PDP context identity for LTE/SAE has the same structure as the current NSAPI value for other 3GPP access systems (i.e., a 4-bit value with 11 defined values).

It should be noted that the protocol discriminator is half an octet. This is because, as defined in 3GPP TS 24.007, the current protocol discriminator encoding has two spare values in place that may be used without needing to use the defined extension mechanism. These are '0111' and '1101'. Also, the reserved value '0010' may also be used since it has been reserved for a protocol which no longer exists Therefore, up to three different values can be used for the new MM and SM protocols for LTE/SAE. The existing protocol discriminator values are shown in the table below:

3GPP TS 24.007 Protocol Discriminator Values

| bits | | | | |
|---|---|---|---|---|
| 4 | 3 | 2 | 1 | |
| 0 | 0 | 0 | 0 | group call control |
| 0 | 0 | 0 | 1 | broadcast call control |
| 0 | 0 | 1 | 0 | Reserved: was allocated in earlier phases of the protocol |
| 0 | 0 | 1 | 1 | call control: call related SS messages |
| 0 | 1 | 0 | 0 | GPRS Transparent Transport Protocol (GTTP) |
| 0 | 1 | 0 | 1 | mobility management messages |
| 0 | 1 | 1 | 0 | radio resources management messages |
| 1 | 0 | 0 | 0 | GPRS mobility management messages |
| 1 | 0 | 0 | 1 | SMS messages |
| 1 | 0 | 1 | 0 | GPRS session management messages |
| 1 | 0 | 1 | 1 | non call related SS messages |
| 1 | 1 | 0 | 0 | Location services |
| 1 | 1 | 1 | 0 | reserved for extension of the PD to one octet length |
| 1 | 1 | 1 | 1 | reserved for tests procedures described in [5a] 3GPP TS 44.014 and [17a] 3GPP TS 34.109. |

The present invention further includes an LTE/SAE only UE according to this description. Such a UE would not support or be supported by any existing 3GPP access system (e.g., GERAN).

The advantages of the present invention include the use of fully tested procedures, and the development of solutions that are easier to implement, test and deploy in the market. Without the present invention, new (and much different) procedures than the existing ones would be necessary in order to fulfill the requirements outlined for LTE/SAE. As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. Call management procedures for use in a Long Term Evolution/System Architecture Evolution (LTE/SAE) system, said system including a Serving GPRS Support Node (SGSN) and an Evolved Universal Terrestrial Radio Access Network (EUTRAN), said procedures comprising:
   a Mobility Management Entity (MME) arranged to provide Non-Access Stratum (NAS) signaling between the SGSN and the EUTRAN according to General Packet Radio Service (GPRS) Mobility Management (MM) procedures;
   wherein the MME is arranged to provide NAS signaling according to GPRS Session Management (SM) procedures;
   wherein the SM for LTE/SAE includes a packet data protocol (PDP) context in order to establish, modify or tear down PDP sessions; and,
   wherein the procedures establish, modify or tear down PDP sessions in the same manner as that in GMM/SM, as performed from the MME or a User Equipment (UE).

2. The call management procedures of claim 1, further comprising an authentication and ciphering procedure for LTE/SAE whereby authentication and key agreement between the UE and MME can take place.

3. The call management procedures of claim 2, wherein the ciphering and integrity protection of the MM and SM information for LTE/SAE is provided by the conventional procedure or by a new specific security mode command for the MME for LTE/SAE in a similar way as the one used by lower layers in UTRAN.

4. A telecommunications system, comprising: an Serving GPRS Support Node (SGSN);
   an Evolved Universal Terrestrial Radio Access Network (EUTRAN); and
   a Mobility Management Entity (MME) arranged to provide communication between the SGSN and the EUTRAN, whereby the MME is arranged to provide Non-Access Stratum (NAS) signaling according to GPRS Mobility Management (MM) procedures;
      wherein the MME is arranged to provide NAS signaling according to GPRS Session Management (SM) procedures;
      wherein the SM for LTE/SAE includes a packet data protocol context in order to establish, modify or tear down Packet Data Protocol (PDP) sessions; and,
      wherein the procedures establish, modify or tear down PDP sessions in the same manner as that in GMM/SM, as performed from the MME or the UE.

5. The telecommunications system of claim 4, further comprising the MME having an authentication and ciphering procedure for LTE/SAE whereby authentication and key agreement can take place.

6. The telecommunications system of claim 5, wherein the ciphering of the information for LTE/SAE is provided by the conventional procedure or by a specific security mode command for the MM for LTE/SAE as the one used by lower layers in UTRAN.

* * * * *